(Model.)
T. WAGNER.
Iron Corner Monument.
No. 238,997.               Patented March 15, 1881.
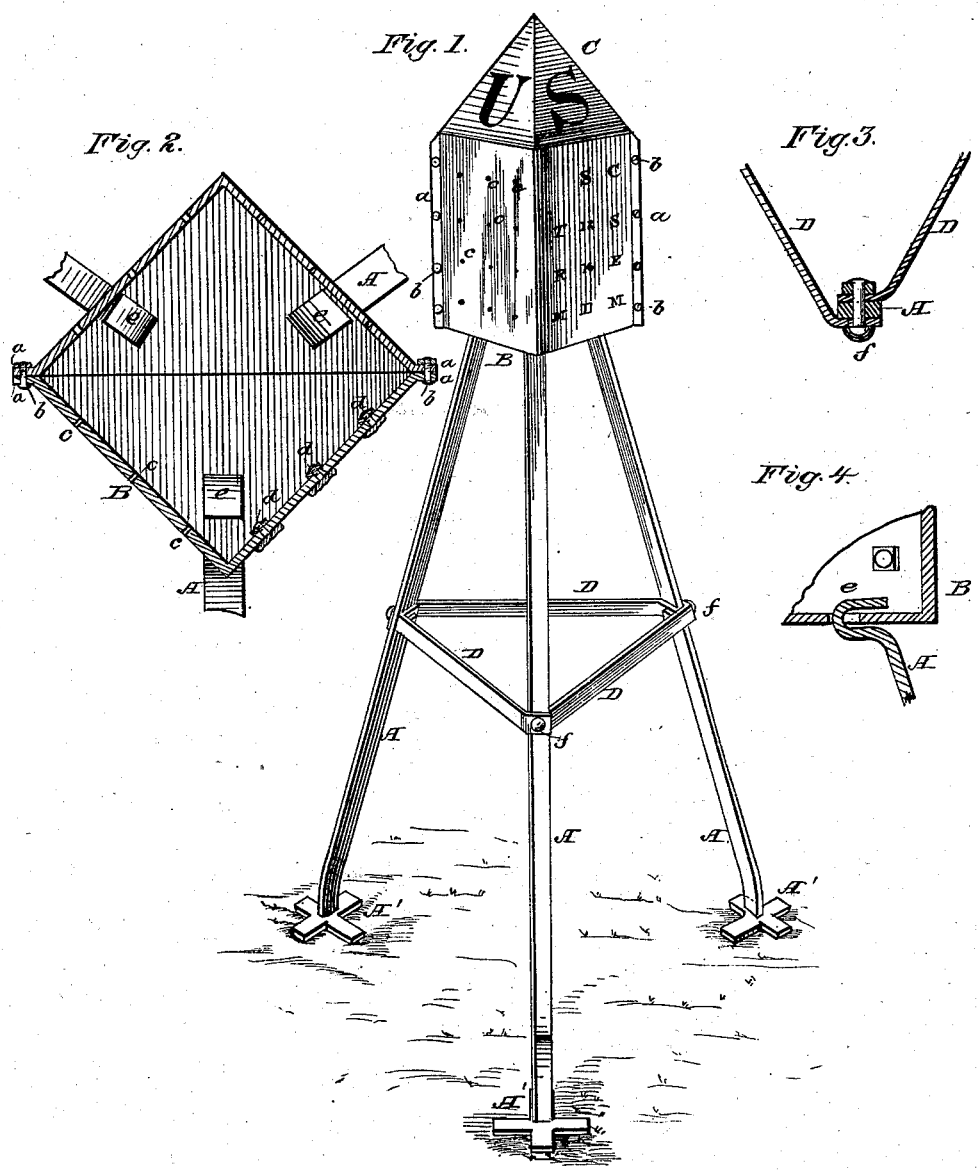

UNITED STATES PATENT OFFICE.

THEODORE WAGNER, OF SAN FRANCISCO, CALIFORNIA.

IRON CORNER-MONUMENT.

SPECIFICATION forming part of Letters Patent No. 238,997, dated March 15, 1881.

Application filed February 15, 1881. (Model.)

*To all whom it may concern:*

Be it known that I, THEODORE WAGNER, of San Francisco, in the county of San Francisco and State of California, have invented certain new and useful Improvements in Iron Corner-Monuments; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view. Fig. 2 is a horizontal section of the hollow top part or monument proper. Fig. 3 is a horizontal section through one corner of the rod-connecting braces or brace-irons, and Fig. 4 is a detail view of the upper end of one of the rods of the support or tripod.

Similar letters of reference indicate corresponding parts in all the figures.

My invention relates to monuments for marking the corners of townships, &c., in surveying land. It is of the utmost importance to make these monuments permanent as well as conspicuous, so that they may be readily found, and to this end suitably-shaped blocks of stone have generally been used, which have been embedded into the ground a sufficient distance to make their displacement, by accident or otherwise, a matter of some difficulty; but the great weight of a stone corner-monument is a serious objection, as it often has to be transported long distances over rough roads and wagon-trails, or upon the backs of mules in mountainous districts where wagons cannot pass.

My improved corner-monument is made of iron, in such a manner that it can readily be taken apart and as readily put together, and when taken apart its several parts or sections are of no greater weight than that they can be easily packed on mules or horses, even over the roughest and most difficult mountain roads and passes.

In the annexed drawings, the letters A A A represent three rods of iron, each about four feet in length, which together constitute the support or tripod for the monument B. This is about eighteen inches in height, square in cross-section, with a pyramidal top or apex, C. The part B C is made of cast-iron, hollow, in two sections, each one of which is cast with two flanges, *a a*, diagonally opposite to one another, by means of which the two parts or sections may be united by bolts *b*, which are properly nutted and hammered down on their nutted ends to prevent the nuts from working loose. The four sides or faces of the square part B have rows of perforations *c*, arranged in parallel tiers for the attachment of cast-metal letters or numerals, each of which has a screw-threaded pin or shank, *d*, (see Fig. 2,) which is inserted into its appropriate aperture and fastened by a nut on the inside, (before the two sections of the monument are put together,) the projecting inner end of the shank being hammered down upon the nut to keep it firmly in place. The sides of the apex are cast with the letters " U. S. C. M.," (United States Corner-Monument,) to designate its object, there being one letter on each of its four sides, and the letters on the square sides indicate the corner, township, range, and other appropriate marks.

The cap or monument proper B C is secured upon the top of the tripod by hooks *e*, formed by bending the upper end of each of the rods A, as shown in Fig. 4, and then hooking the bent end into slots made in the bottom of the hollow monument. The rods A are then spread apart at the lower end and connected about midway, or two feet from either end, by braces D, secured upon the rods by bolts *f*, which are nutted at their inner ends, as shown more clearly in Fig. 3, and then hammered down to prevent the nuts from working loose. At the lower end of each of the tripod-rods A is a cross, A', bolted into the end of the rod to give it a firm hold in the ground.

In erecting this monument it is, after the proper place has been reached, first put together in the manner described, attached to the tripod, and a hole is then dug into the ground about two feet deep, and the tripod sunk into it up to the cross-braces D. The hole is then filled up and the dirt compacted by tamping, after which a mound is built up two feet in height around the upper part of the tripod, which will reach to the under side or bottom of the top part, B C, when the monument is complete.

This monument is easily distinguished from private marks or stakes of any other kind. It is not affected (when properly set) by floods or freshets, and will withstand the attacks of buffaloes or stock of any kind. The part B C, which projects above the ground, may be painted red, or any other desired color, to protect it against rust and make it as conspicuous as possible.

Having thus described my invention, I claim and desire to secure by Letters Patent of the United States—

1. The hollow top piece or cap, B C, made in two sections, provided with the side flanges, a a, and having rows of perforations c arranged in parallel tiers on each of its four sides, as set forth.

2. The combination, with the hollow top piece or cap, B C, made in two sections, provided with the side flanges, a a, and having rows of perforations c arranged in parallel tiers on each of its four sides, of detachable letters having threaded shanks d, nutted at their inner ends, within the hollow cap B C, as set forth.

3. The iron corner-monument composed of the hollow top piece or cap, B C, made in two sections, provided with the side flanges, a a, and with detachable letters or marks on one or more of its four sides or faces, and the tripod A A A, having hooks e at its upper end, braces D and crosses A' at its lower end, constructed and combined substantially as and for the purpose herein shown and set forth.

In testimony that I claim the foregoing as my own I have hereunto affixed my signature in presence of two witnesses.

THEODORE WAGNER.

Witnesses:
AUGUST PETERSON,
JAMES H. MANDEVILLE.